Aug. 6, 1957  R. R. COLBURN  2,801,510
TRACTOR MOUNTED ROTARY DISC MOWER
Filed Dec. 16, 1953  2 Sheets-Sheet 1

INVENTOR.
Richard R. Colburn
BY
ATTORNEY.

Aug. 6, 1957  R. R. COLBURN  2,801,510
TRACTOR MOUNTED ROTARY DISC MOWER
Filed Dec. 16, 1953  2 Sheets-Sheet 2

INVENTOR.
Richard R. Colburn
BY
ATTORNEY.

United States Patent Office 2,801,510
Patented Aug. 6, 1957

2,801,510

TRACTOR MOUNTED ROTARY DISC MOWER

Richard R. Colburn, Kansas City, Mo.

Application December 16, 1953, Serial No. 398,578

8 Claims. (Cl. 56—25.4)

This invention relates to machines for cutting or mowing grass, underbrush and the like, and refers more particularly to a tractor-type mower carrying cutting elements of the horizontal whirling blade type.

A primary object of the invention is to provide a power mowing unit of the character described in which the cutting elements are disposed on opposite sides of and are spaced laterally from a tractor-type vehicle which serves as the power unit for the mowers. In the preferred embodiment, the cutting elements are so located with respect to the vehicle as to extend laterally beyond the vertical wheel planes of the outermost wheels on the vehicle to make it possible not only to cut closely adjacent walls, trees or the like, but also to permit unimpeded access to the space under overhanging branches and limbs located close to the ground.

Another object of the invention is to provide a horizontal whirling blade mower in which, by virtue of the location of the whirling blades and their housings and the position of the operator relative thereto, the operator is protected from flying fragments of rock or other articles which may be caught up in the blades.

A further object of the invention is to provide a mower of the character described which carries a plurality of rotary blades so arranged with respect to one another and to the tractor unit as to present a continuous cutting edge through the full width of the mower, and a drive mechanism for the blades in which all blades are driven from a single, common drive shaft. In the preferred embodiment of the invention, a single engine is used both for driving the traction wheels of the vehicle and the drive shaft for the mowers.

Another object of the invention is to provide a mowing unit of the character described in which the main rotary blades are so mounted on the tractor unit that they are free to rise and fall with changing ground contours and maintain an even cut. An important feature of the invention resides in the means for effecting the mounting on the tractor so that the drive connection from the power source is not interrupted or interfered with during such rise and fall. Also, the mounting is so arranged as to permit the blades and their housings to be secured in a partially upright position on the sides of the tractor when not in use.

A further object is to provide a mower of the character described in which the blade support or housing and its attached blade on either side can be quickly disconnected and removed from the tractor without affecting the operation of the blade on the other side. This finds particular advantage where it is desired to cut on only one side of the mower, and where the space for operation is cramped.

Another object is to provide a tractor-type mower in accordance with the foregoing objects which is compact in construction, simple to operate, and in which the tractor can serve as a conventional draft vehicle for other purposes when the cutting blades are removed or rendered inoperative.

Other and further objects, together with the features of novelty appurtenant thereto, will appear in the course of the following description.

In the accompanying drawings, which form a part of the specification and are to be read in conjunction therewith, and in which like reference numerals indicate like parts in the various views.

Figure 1:
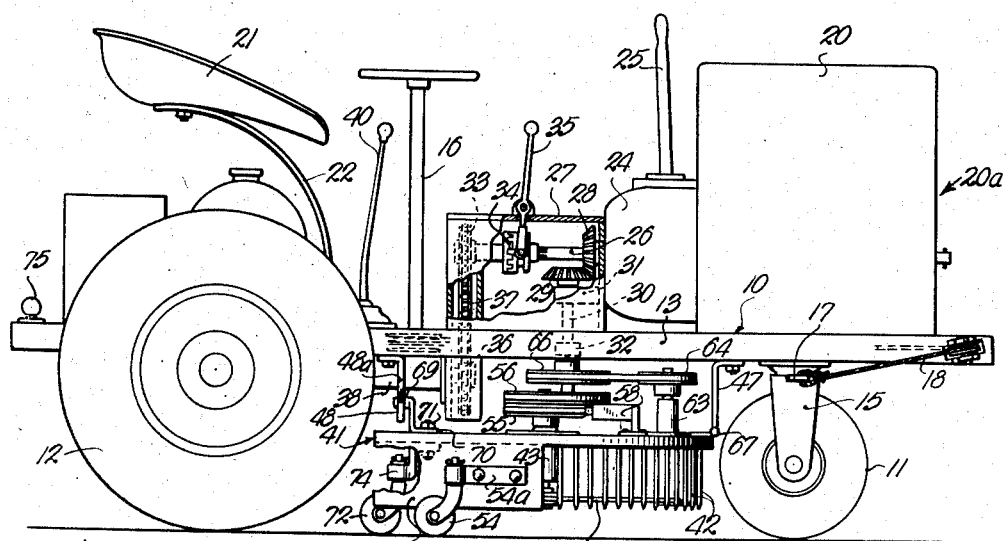
Fig. 1 is a side elevational view of a preferred embodiment of the invention, parts being broken away for purposes of illustration.
Figure 2:
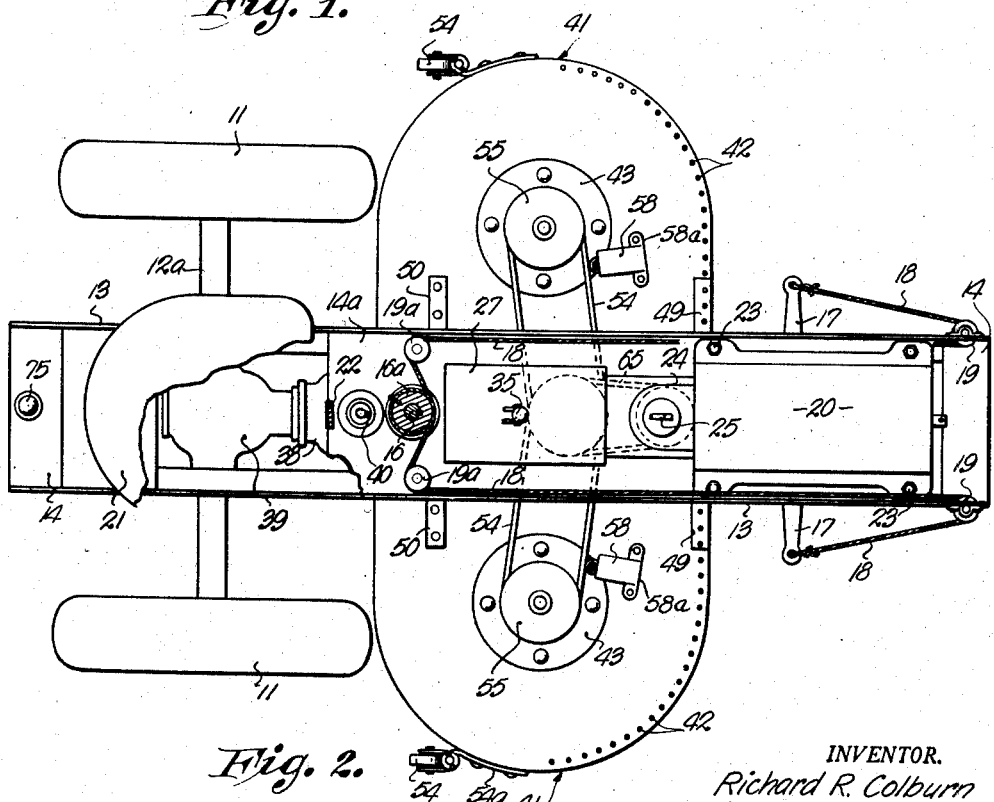
Fig. 2 is a top plan view of the embodiment shown in Fig. 1, parts being broken away for purposes of illustration.

Referring to the drawings, the tractor vehicle for the mowing unit is illustrated in Figs. 1 and 2, and comprises a chassis 10 supported at its front end by the single front wheel 11 and at the rear by the spaced larger rear wheels 12. As is best seen in Fig. 2, the chassis preferably is formed of spaced, parallel angles 13 connected at each end to one another by cross pieces 14 to provide a rigid structure. Throughout the major portion of the length of the chassis an elongated rectangular steel plate 14a spans the angles 13, resting on the inwardly turned legs of the angles (see Fig. 3) and secured thereto to provide a deck or floor for the unit. The front wheel 11 is journaled on the chassis on a yoke 15, and can be turned by means af a steering column 16. Arms 17 extend laterally from the yoke 15, and connect at their respective ends with cables 18 which pass forwardly to the nose of the tractor, around pulleys 19 (mounted in suitable apertures in the angles 13) and rearwardly along the angles to a point adjacent steering column 19 where they bend around a second set of pulleys 19a to connect with a winch drum 16a secured to the lower end of the steering column 16 and turnable therewith. The cables are installed in taut condition, and it will be evident that turning of the steering column 16 causes a corresponding rotation of the yoke 15 and turning of the wheel 11.

At the rear of the chassis is mounted a seat 21 for the operator which is supported in conventional fashion on a spring arm 22 anchored at its other end to the chassis 10.

The engine 20 is a conventional internal combustion engine, and is secured to the chassis 10 in any suitable fashion, such as by bolts 23 (see Fig. 2). A clutch housing 24 projects from the rearward end of engine 11, and carries therein a simple clutch mechanism adapted to be actuated by lever 25. A rotary drive shaft 26 extends rearwardly from the housing 24 into a gear box 27 mounted on the chassis. A bevel gear 28 is secured to shaft 26, and meshes with a second bevel gear 29 to drive a vertically disposed shaft 30 which is journaled in thrust bearings 31 and 32 and extends downwardly through the floor 14a to provide a drive shaft for the blade units, as will be described hereinafter.

The drive to the rear wheels of the tractor 12 is also accomplished through the engine drive shaft 26. As shown in Fig. 1, a toothed sprocket 33 is rotatably supported in the gear box 27 and connected with a clutch 34.

The shaft 26 is connected with the sprocket 33 through the clutch 34, and can be drivingly engaged with and disengaged from the sprocket 33 by actuation of the clutch lever 35. The sprocket 33 is drivingly connected with a second sprocket 36 below the chassis by means of a chain 37. Sprocket 36 is fixed to a shaft extending from a conventional transmission unit 38 which connects with the rear axle 12a in the usual fashion through a differential 39. A gear shift lever 40 is associated with the transmission 38 to obtain changes in gear ratio to the rear axle and for reversing the direction of movement.

Turning now to the mowing blades and their means of support on the tractor unit, extending laterally from each side of the tractor are the blade housings 41 which take the form of flat platforms rounded at their outer edges. A depending flange 41a is provided around the rearward half of the margin of each of the housings. The forward or leading edge of each housing 41 carries depending, spaced rods 42 which are secured to the housing and form a grill-like front for the housings. These rods may be secured to the platforms 41 in any suitable fashion; preferably, they are threaded at their upper ends and screwed into drilled and tapped apertures spaced along the margin of the platform.

Located centrally on each housing and secured thereto are bearing members 43 in which are rotatably journaled the blade shafts 44 which carry at their lower ends the horizontally disposed blade arms 45. Each arm 45 is fitted at its opposite ends with cutting blades 45a, as in the conventional rotary blade type mower. The total length of each arm 45 with its blades 45a is such that the blades rotate wholly within the housings 41.

Figure 3:
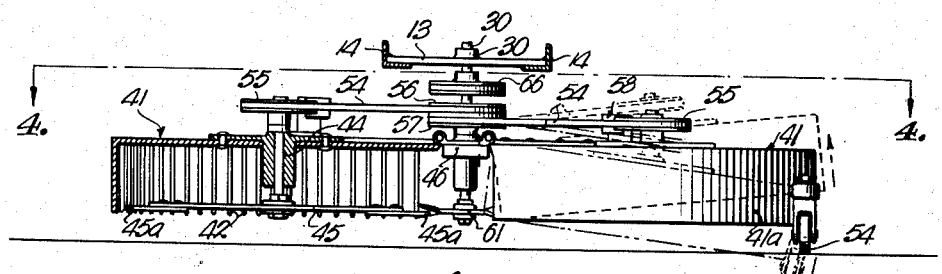
Fig. 3 is a view taken along the line 3—3 of Fig. 4 in the direction of the arrows.
Figure 4:
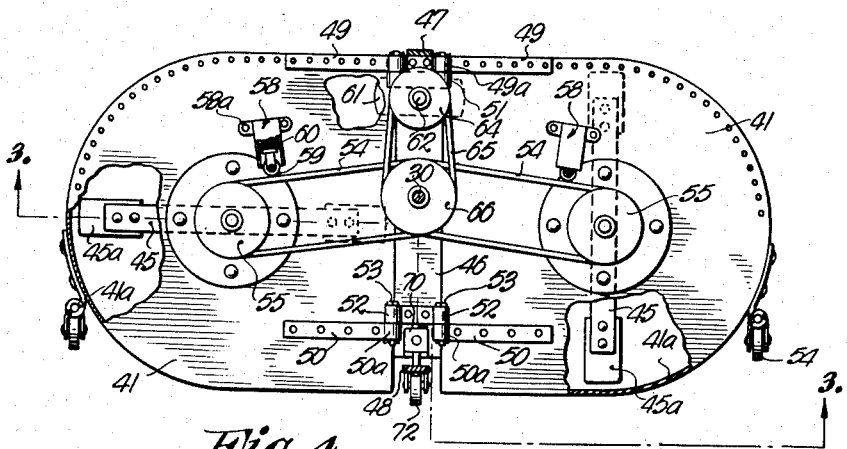
Fig. 4 is a view taken along the line 4—4 of Fig. 3 in the direction of the arrows, parts being broken away for purposes of illustration.

As is best seen in Figs. 3 and 4, the straight inboard edges of each platform 41 lie adjacent a plate-like frame member 46 which is aligned with and suspended beneath the chassis on end brackets 47 and 48. The bracket 47 is preferably of bar stock, being secured centrally to the underside of the deck 14a, and the bracket 48 is a generally Y-shaped member having legs 48a (see Fig. 5) which depend from the deck 14a on opposite sides of the transmission 38. Fore and aft hinge straps 49 and 50 are secured to the tops of each housing 41, and are provided with pin receiving lugs 49a and 50a which are aligned with similar lugs 51 and 52 secured to the frame member 46. Removable hinge pins 53 are received through the lugs and serve to connect the inboard edges of the housings 41 to the frame member for pivotal movement about the hinge axes, which are generally aligned with the normal straight line path of travel of the tractor. A caster-type wheel 54 is secured to the outboard portion of each housing 41 to ride upon the ground and maintain the blade at the proper cutting level with respect thereto. The wheels 54 are each carried by brackets 54a secured to the depending flanges 41a on the housings.

Figures 5, 6, 7:
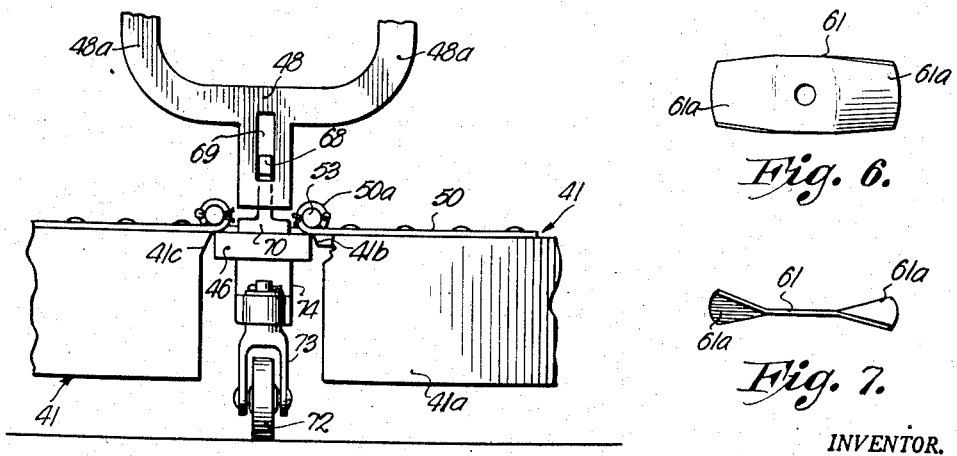
Fig. 5 is an enlarged rear elevation of the central frame member and adjacent blade housings, showing the manner of connection of the frame member with the depending support strap on the vehicle.
Fig. 6 is an enlarged plan view of the auxiliary blade member.
Fig. 7 is an edgewise view of the blade member shown in Fig. 6.

As is particularly shown in Fig. 5, care must be taken to bevel the inboard edges 41b of the housings 41 away from the adjacent sides of the frame member 46 to allow pivotal movement of the housings about their hinges 53. The similarly inclined portions 41c of the depending flanges 41a serve to provide stops for limiting the downward movement to a desired degree. Preferably the edge 41c should be pitched at such an angle that when the downward displacement of the outermost point on the housing approaches three inches, the inclined edge will engage the frame member and prevent further downward movement.

The mower blade arms 45 are rotated for cutting through the sidewardly extending flexible V-belts 54, one for each side. Drive pulleys 55 are secured to the upper ends of each of the blade shafts 44, and the V-belts drivingly connect these pulleys with the pulleys 56 and 57 secured to the lower end of the vertical drive shaft 30. As is evident from Fig. 3, the pulleys 55 on the opposite housings 41 are at different levels, each being located on a level with its associated central drive pulley 56 or 57.

The location of the hinge axis of each of the housings 41 closely adjacent the axis of the drive shaft 30 insures that the rise and fall of the housings 41 as previously described will not result in any appreciable slackening of the drive belts 54. However, to take up the slight slack which does result when the angle of inclination becomes rather pronounced, I have provided the belt tighteners indicated generally at 58. Each comprises a tubular member closed at one end and having a spring-loaded plunger fitted with a roller 59 extending from the other end. The rollers 59 are continuously urged against the belts 54 by coil compression springs 60 located inside the tubular members and urging the roller carrying plungers outwardly. The belt tighteners 58 are secured to the top of the housings 41 in any suitable fashion, such as by brackets 58a bolted or welded thereto.

It will be evident from Figs. 3 and 4 that by virtue of being mounted on opposite sides of the frame member 46, a gap exists between the innermost points of the blade circle of each of the main mower blades. To fill this gap, and insure of a continuous cutting edge across the full width of the unit, I have provided a third or auxiliary blade member 61 which is journaled in the frame member 46 forwardly of a line drawn between the axis of the blade arms 45. This blade 61 is of substantially smaller span than the blade arms 45, but of sufficient length to bridge the gap between the tips of the blades 45a without interfering with the path of either. The blade 61 is carried by a shaft 62 supported in a bearing 63, and a drive pulley 64 is secured to the upper end of shaft 62. A belt 65 similar to belts 54 drivingly connects the blade pulley 64 with a pulley 66 secured to the vertical drive shaft 30 to provide means for rotating the blade 61.

It will be noted from Figs. 6 and 7, which show the blade 61 in more detail, that the ends 61a of the blade are twisted in opposite directions to provide a pronounced fan-like pitch. The degree of pitch is greater than that normally provided on rotary type mower blades, and when rotated at high speed the blade 61 creates a powerful updraft which is sufficient to lift the blades of grass which have been flattened by the wheel 11. To obtain a higher rate of rotation for the blade 61 than the side blades 45, the drive pulley 64 is provided with a diameter substantially less than that of the pulleys 55, preferably two-thirds to one-half of the latter.

An important feature of the invention lies not only in the hinging of the blade housings 41 for movement about a longitudinal axis, but also in supporting them for movement about a transverse axis so that the rear portions are raised to prevent digging in as the tractor passes over a ridge or crown of an incline. As will be noted particularly from Fig. 1, the forward end of the frame member 46 is connected with the depending strap bracket 47 through a hinge 67 disposed transversely with respect to the longitudinal center line of the tractor. The rearward end of the frame member 46, on the other hand, is connected with its bracket 48 for limited up and down movement relative thereto, the connection being made through a rearwardly projecting tongue 68 secured to the frame member 46 and slidably received in an elongated slot 69 formed in the lower portion of the bracket 48 (Fig. 5). The tongue 68 is preferably formed as an integral part of a lug 70 secured to the top of the member 46 by a bolt 71. The length of the slot is preferably in the neighborhood of three inches, and its lower end is so located that the tongue 68 rests on the bottom of the slot during mowing over a level course.

Lifting of the rearward end of the frame member 46 (and the rear portions of the housings 41) is accomplished by the simultaneous action of the outboard wheels 54 on the housings and a center wheel 72 which depends from the frame member 46. As illustrated, wheel 72 is carried in a yoke 73 which is castered within a support bracket 74 secured to the underside of frame member 46. The wheel 72 is so spaced below the frame 46 that when the tractor is operating on a level lie, the wheel lightly engages the ground and the tongue 68 rides on the bottom of the slot 69. Any ridges or crowns which lie in the path of the wheels 54 and 72 cause the wheels to lift the respective portions of the assembly, the wheels 54 causing the outboard ends of the mower housings 41 to shift upwardly and the center wheel 72 lifting the rearward end of the member 46 together with the attached inboard edges of the housings. Through the pivotal connections thus provided, not only are the blade housings 41 capable of up and down movement about parallel axes disposed longitudinally of the tractor, but are also shiftable about the transverse hinge axis 67. The flexible character of the drive belts 54 and 65 permits of such movement without interfering with the driving connection between the blades and the drive shaft 30.

The operation of my invention is believed evident from the foregoing description. As the mower travels over the terrain, the mowing blades 45 and 61 are rotated at high speed through gears 28 and 29, shaft 30, and belts 54 and 65. The grass or other growth enters the housings 41 through the grill rods 42 and is severed by the tips of the blades 45a and 61. No uncut swaths are left intermediate the tips of the housings 41, the blade 61 serving to combine with the blades 45 to present an approaching cutting edge spanning the width of the unit. The relatively greater rate of rotation of the blade 61, coupled with the high pitch of the blade ends 61a, insures that the crushed and flattened grass in the path of the front wheel 11 will be lifted upright for proper cutting.

Cutting under the overhanging branches of hedge rows, or closely adjacent walls and trees, is facilitated by the extension of the housings 41 and blades 45 laterally beyond the outermost points on the rear wheels 12. As will be evident, the outer edge of the housing can be brought closely adjacent the wall or tree without interference from the tractor wheels, and the outer portion of the housing can be introduced underneath the overhanging limbs on short trees and shrubs. During cutting, the operator is well above the danger zone created by flying rocks or other articles picked up and thrown out by the rapidly whirling blades 45. Added protection is provided by the tops and rear depending flanges of the housings 41.

The mower finds particular advantage in operating over rough and uneven terrain. Through the hinge connection of the housings 41 with the frame member 46, the outboard portions of the housings dip and rise as the wheels 54 ride over and through ridges and hollows. The pivotal connection about axes generally parallel with the normal straight line path of the vehicle is supplemented by the hinge connection of the frame member 46 with the tractor for movement about a transverse axis (hinge 67), the wheel 72 causing the rearward ends of the frame member 46 and attached housings 41 to rise as it rides up over a ridge. The wheel 72 and hinge connection 67 also serve to prevent digging in of the blades and housings as the tractor proceeds from the level over a crown to a downward incline. As the chassis 10 tilts down at the nose 20a, the wheel 72 and wheels 54 cause the housings and rearward end of the frame member 46 to rise, guided in a vertical path by the tongue 68 in slot 69. It will be noted that the freedom of the housings 41 to pivot about their pins 53 is unimpeded by the tilting of the member 46, the rise of the rear portion of the frame member 46 only causing a shifting of the hinge axis 53 in a vertical plane and still permitting movement of the housings 41 independent of the member 46. During operation, the flexible belts 54 are kept in relatively taut condition by the belt tighteners 58.

As will be evident, the removal of the blade housings 41 from the mower is a simple matter. The belts 54 can be removed with ease by lifting the housings 41 by hand to slacken the belts to a point where they can be disengaged from their pulleys. The hinge pins 53 are then pulled, and the housings 41 are free of the chassis.

The tractor itself, without the blades, can be utilized as a conventional draft unit for a variety of implements, which can be connected to the rear of the tractor by any suitable means such as, for example, the ball cleat 75.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. In a power mowing unit, a three-wheeled carriage having a centrally located front wheel and a pair of laterally spaced rear wheels, a mower support frame depending from the underside of said carriage between said front and rear wheels, substantially horizontal platform members extending outwardly from each side of said frame and hingedly connected therewith along their inboard edges for movement about axes substantially parallel to the normal path of travel of the carriage, ground engaging means connected with the outer portion of each of said platforms to support said platforms at a predetermined spacing above the ground, a horizontally disposed rotary mower blade suspended from the underside of each of said platforms and journaled therein for rotation about an axis normal to the plane of the platform, the axes of said blades being equidistant from the longitudinal center line of said carriage, a power driven shaft parallel to said blade axis and intersecting the longitudinal center line of said carriage, and power transmission means connecting said shaft with said blades to drive same.

2. A unit as in claim 1 wherein said power transmission means includes flexible continuous belts and drive pulleys on said blades.

3. A unit as in claim 1 wherein said frame is pivoted to the carriage at its forward end for movement about an axis transverse to the center line of the carriage, the rear of said frame being connected with the carriage for limited up and down movement relative thereto.

4. In a power mower, a wheeled carriage including a chassis and having a forward and a rearward end, a power unit mounted on said carriage, a mower support member slung from the underside of said carriage and aligned longitudinally therewith, the forward end of said support member being connected with said chassis for movement about a fixed pivot axis transverse to the normal path of travel of the carriage, ground engaging means connected with and supporting the rearward end of said support member to cause said member to pivot about said axis and relative said chassis in response to changes in the ground contour as said carriage advances, a laterally extending blade housing connected with said support member, said blade housing being pivotally connected with said support member for movement about an axis substantially parallel with the normal path of travel of the carriage, a horizontal rotary mower blade journaled in and suspended beneath said housing, a ground engaging wheel connected with and supporting the outer end of said housing, a power unit mounted on said carriage, and power transmission means drivingly connecting said power unit with said blade.

5. In a power mower, a carriage having a forward end and a rearward end, front and rear wheels supporting said carriage, a mower support member depending at its forward end from the underside of said carriage between said front and rear wheels and aligned with said carriage, the forward end of said support member being pivotally connected with said carriage for movement about a fixed pivot axis transverse to the normal path of travel of the carriage, ground engaging means connected with and supporting the rearward end of said support member to cause said member to pivot about said axis and relative said carriage in response to changes in the ground contour as said carriage advances, said ground engaging means being located at a point forward of said rear wheels, substantially horizontal platform members extending outwardly on the opposite sides of said support member, each of said platform members being hingedly connected along their inboard edges with said support member for movement about an axis substantially parallel to the normal path of travel of the carriage, ground engaging means connected with the outer portion of each of said platforms to support said platforms and to follow the ground contour, a horizontally disposed rotary mower blade suspended from the underside of each of said platforms and having a shaft journaled therein for rotation about an axis normal to the plane of the platform, a power unit mounted on said carriage and having a drive shaft depending vertically below said carriage, drive pulleys on said drive shaft and on the upper ends of said mower blade shafts above said platforms, and flexible continuous belts connecting said pulleys to cause rotation of said blades in response to rotation of said drive shaft.

6. In a power mower, a wheeled carriage having a forward end and a rearward end, a power unit mounted on said carriage, a mower support member slung from the underside of said carriage and aligned longitudinally therewith, the forward end of said support member being connected with said carriage near its forward end for movement about a pivot axis transverse to the normal path of travel of the carriage, ground engaging means connected with and supporting the rearward end of said support member at a point spaced rearwardly of said pivot axis and independently of the wheels of the carriage to cause said member to pivot about said axis and relative said carriage in response to changes in the ground contour as said carriage advances, a mower blade assembly carried by said support member including a rotary shaft extending upwardly from said support member, a drive pulley mounted on said shaft and concentric therewith whereby the plane of said pulley is substantially parallel with but spaced above said support member, a power take-off pulley drivingly connected with said power unit and spaced rearwardly from said drive pulley, and flexible power transmission means between said power take-off pulley and said drive pulley including a flexible endless belt trained about said drive pulley at one end and extending rearwardly and trained about said power take-off pulley at the other end, said belt bridging the space between said pulleys and maintaining a continuous drive connection between said power take-off pulley and said drive pulley despite movement of said drive pulley relative to said power take-off pulley as said support member pivots relative said carriage.

7. In a power mower, a carriage having a forward end and a rearward end, front and rear wheel means connected with and supporting respectively the forward and rearward ends of said carriage, a mower support bracket depending from the underside of said carriage near the front end thereof, a substantially horizontal mower support member pivotally connected with said bracket to permit movement of said support member relative said carriage about an axis transverse to the normal path of travel of said carriage, said mower support member extending rearwardly beneath said carriage from said bracket, ground engaging means connected with and supporting the rearward end of said support member to cause said member to pivot about said axis and relative said carriage in response to changing ground contours as said carriage advances, a horizontally disposed rotary mower blade on the underside of said mower support member, a shaft connected with said blade and journalled in said support member for rotation about an axis normal to the plane of the support member, a drive pulley mounted on the upper end of said shaft and concentric therewith, a power unit mounted on said carriage having a take-off pulley spaced rearwardly from said drive pulley, and a flexible endless belt trained around said drive pulley at one end and extending rearwardly and trained about said power take-off pulley and said drive pulley, despite movement of said drive pulley relative said power take-off pulley as said support member pivots relative to said carriage.

8. In a power mowing unit, a carriage having a forward end and a rearward end, front and rear wheel means connected with and supporting respectively the forward and rearward ends of said carriage, a mower support frame depending from the underside of said carriage between said front and rear wheel means, substantially horizontal platform members extending outwardly from each side of said frame and hingedly connected therewith along their inboard edges for movement about axes substantially parallel to the normal path of travel of the carriage, ground engaging means connected with the outer portion of each of said platforms to support said platforms at a predetermined spacing above the ground, a horizontally disposed rotary mower blade suspended from the underside of each of said platforms and journalled therein for rotation about an axis normal to the plane of the platform, the axes of said blades being equidistant from the longitudinal center line of said carriage, a power driven shaft parallel to said blade axes and intersecting the longitudinal line of said carriage, and power transmission means connecting said shaft with said blades to drive same.

References Cited in the file of this patent

UNITED STATES PATENTS

| | | |
|---|---|---|
| 2,134,115 | Flammang | Oct. 25, 1938 |
| 2,489,204 | Sprick et al. | Nov. 22, 1949 |
| 2,494,271 | Turner et al. | Jan. 10, 1950 |
| 2,682,740 | Miller et al. | July 6, 1954 |
| 2,688,833 | Weiss et al. | Sept. 14, 1954 |